United States Patent [19]
Risk, Jr. et al.

[11] Patent Number: 6,020,563
[45] Date of Patent: Feb. 1, 2000

[54] MULTI-FUNCTION STALK SWITCH

[75] Inventors: James R. Risk, Jr., Madison; Bruce Scott Rigsby, Charlestown; Curtis L. Lidikay, Hanover; Cary D. Branstetter, Brookville, all of Ind.

[73] Assignee: Grok Industries, Inc., Madison, Ind.

[21] Appl. No.: 09/130,333

[22] Filed: Aug. 6, 1998

[51] Int. Cl.⁷ .................................................. H01H 9/00
[52] U.S. Cl. ........................................................ 200/61.54
[58] Field of Search ............................. 200/61.54, 61.27, 200/415 R, 61.57, 1 R–18; 361/748.749, 750, 751, 748

[56] References Cited

U.S. PATENT DOCUMENTS

| | | | |
|---|---|---|---|
| 4,419,546 | 12/1983 | Arthur | 200/11 G |
| 4,723,057 | 2/1988 | Lane, Jr. | 200/61.27 |
| 5,003,132 | 3/1991 | Lagier | 200/4 |
| 5,047,600 | 9/1991 | Enari et al. | 200/61.54 |
| 5,075,519 | 12/1991 | Hayakawa | 200/61.54 |
| 5,107,243 | 4/1992 | Maeda | 338/172 |
| 5,200,584 | 4/1993 | Nagaya | 200/4 |
| 5,272,290 | 12/1993 | Suzuki et al. | 200/4 |
| 5,430,265 | 7/1995 | Beattie et al. | 200/61.54 |
| 5,436,413 | 7/1995 | Katakami | 200/14 |
| 5,453,588 | 9/1995 | DuRocher et al. | 200/61.54 |
| 5,473,809 | 12/1995 | DuRocher et al. | 29/622 |
| 5,581,058 | 12/1996 | Javery et al. | 200/4 |
| 5,600,110 | 2/1997 | Neubauer | 200/61.54 |
| 5,610,378 | 3/1997 | DuRocher et al. | 200/61.54 |
| 5,691,519 | 11/1997 | Mahr | 200/61.54 |
| 5,723,205 | 3/1998 | Millette | 428/209 |
| 5,742,014 | 4/1998 | Schwartz et al. | 200/61.27 |
| 5,747,763 | 5/1998 | Uchiyama et al. | 200/61.54 |
| 5,859,396 | 1/1999 | Yokoyama | 200/61.54 |

*Primary Examiner*—Michael L. Gellner
*Assistant Examiner*—Nhung Nguyen
*Attorney, Agent, or Firm*—Woodward, Emhardt, Naughton Moriarty & McNett Patent And Trademark Attorneys

[57] ABSTRACT

A multi-function stalk switch that incorporates a pushbutton switch, a first rotary switch and a second rotary switch onto the end of a stalk, wherein further switching functions may be executed by moving the entire stalk in either of two orthogonal planes. The stalk switch incorporates many design features that enable it to be assembled at low cost from a small number of parts. One such feature is the use of plastic-on-plastic detents to control positioning of the rotary switches so that they wipe across predetermined portions of a flexible printed circuit board. Another feature is the inclusion of a spring-loaded plunger detent riding in a concave centering mechanism that is operable to automatically return the stalk switch to its central (neutral) position after removal of external biasing forces. A further feature is the inclusion of magnets on the stalk switch and Hall effect sensors fixedly mounted nearby in order to sense movement of the magnets (and therefore the stalk) in two orthogonal planes. Further features of the invention are also disclosed.

24 Claims, 7 Drawing Sheets

MULTI-FUNCTION STALK SWITCH

TECHNICAL FIELD OF THE INVENTION

The present invention generally relates to electrical switches and, more particularly, to a multi-function stalk switch.

BACKGROUND OF THE INVENTION

There is a need to provide a plurality of control switches that are easily accessible to a stationary operator in the field of motor vehicles, where it is desirable to place all of the controls frequently needed by an operator of the motor vehicle in such a position that they may be manipulated with a minimum of movement by the driver.

It is desirable to incorporate additional functionalities into the stalk switch traditionally used to activate the vehicle turn signals because of the stalk's close proximity to the vehicle steering wheel. However, designers have encountered various problems relating to complexity, cost and reliability as the number of integrated functions increase.

There is therefore a need for a stalk switch capable of activating a multiplicity of functions while maintaining low complexity from an assembly standpoint, low cost and/or high reliability. The present invention is directed toward meeting this need.

SUMMARY OF THE INVENTION

The present invention relates to one or more of the following: A multi-function stalk switch that incorporates a pushbutton switch, a first rotary switch and a second rotary switch onto the end of a stalk, wherein further switching functions may be executed by moving the entire stalk in either of two orthogonal planes. The stalk switch incorporates many design features that enable it to be assembled at low cost from a small number of parts. One such feature may include the use of plastic-on-plastic detents to control positioning of the rotary switches so that they wipe across predetermined portions of a flexible printed circuit board. Another feature may include the inclusion of a spring-loaded plunger detent riding in a concave centering mechanism that is operable to automatically return the stalk switch to its central (neutral) position after removal of external biasing forces. A further feature may include magnets on the stalk switch and Hall effect sensors fixedly mounted nearby in order to sense movement of the magnets (and therefore the stalk) in two orthogonal planes. Further features of the invention are also disclosed.

In one form of the invention, a multi-function switch is disclosed, comprising: a first rotary switch module having a first surface; at least one substantially incompressible first detent formed on said first surface; a rotary switch support member having a second surface; and at least one substantially incompressible second detent formed on said second surface; wherein said at least one first detent engages said at least one second detent; and wherein dimensions of said at least one first detent and said at least one second detent are such that said at least one first detent may be forced to override said at least one second detent when a first sufficient torquing force is applied to said first rotary switch module.

In another form of the invention, a multi-function switch is disclosed, comprising: a first rotary switch module having a first surface; a first conductive bridge contact coupled to said first surface; a rotary switch support member having a second surface; and a flexible circuit board in contact with and substantially conforming to at least a portion of said second surface, said flexible circuit board having a plurality of exposed conductive contacts; wherein said first conductive bridge contact is operable to conductively couple at least two of said contacts when said first rotary switch module is at a first position with respect to said rotary switch support member.

In another form of the invention, a switch stalk is disclosed, comprising: a handle stalk having a proximal end and a distal end; a plunger coupled to said stalk distal end such that said plunger may move linearly with respect to said stalk distal end, said plunger being biased in said distal direction; a rotational receptacle coupled to said handle stalk such that said handle stalk may pivot in at least one plane; and a concave centering mechanism having a concave surface and coupled to said rotational receptacle such that said plunger is in contact with said concave surface; wherein a pivoting force applied to the handle stalk causes said plunger to be displaced along said concave surface, thereby compressing said plunger away from said distal end; and wherein removal of said pivoting force allows distal linear movement of said plunger in response to said plunger bias, thereby forcing said plunger to a center of said concave surface.

In another form of the invention, a multi-function switch is disclosed, comprising: a handle stalk having a proximal end and a distal end; a rotation assembly coupled to said handle stalk such that said handle stalk may be rotated with respect to said rotation assembly in at least one plane; at least one magnet coupled to said handle stalk; and at least one magnetic field sensor; wherein said at least one magnetic field sensor is positioned to sense movement of said at least one magnet when said handle stalk is rotated.

DETAILED DESCRIPTION OF THE PREFERRED EMBODIMENTS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

The preferred embodiment of the present invention comprises a multi-function stalk switch which is adapted for use in a motor vehicle to control one or more of, and preferably all, of the windshield wipers, the windshield washer, the vehicle parking lights, the vehicle headlights, the vehicle auxiliary lights, the vehicle high-beam lights, the vehicle turn signals, a headlight dimmer, a "flash-to-pass" function, and a courtesy marker lamp flash function, which functions are integrated into a single stalk switch which may be conveniently mounted to the vehicle steering column. Those having ordinary skill in the art, however, will appreciate from the following description that the stalk switch described herein, and the novel portions thereof, will find many applications beyond the application used to describe and illustrate the preferred embodiment. For example, the stalk switch of the present invention may be used in the motor vehicle setting to control other vehicle functions in various combinations, and also in the non-motor vehicle setting, to conveniently control a multiplicity of functions from a single position. Accordingly, the functions ascribed to the various switches in the preferred embodiment are to be considered as illustrative only, and are not intended to limit the apparatus described and claimed herein.

Figure 1:
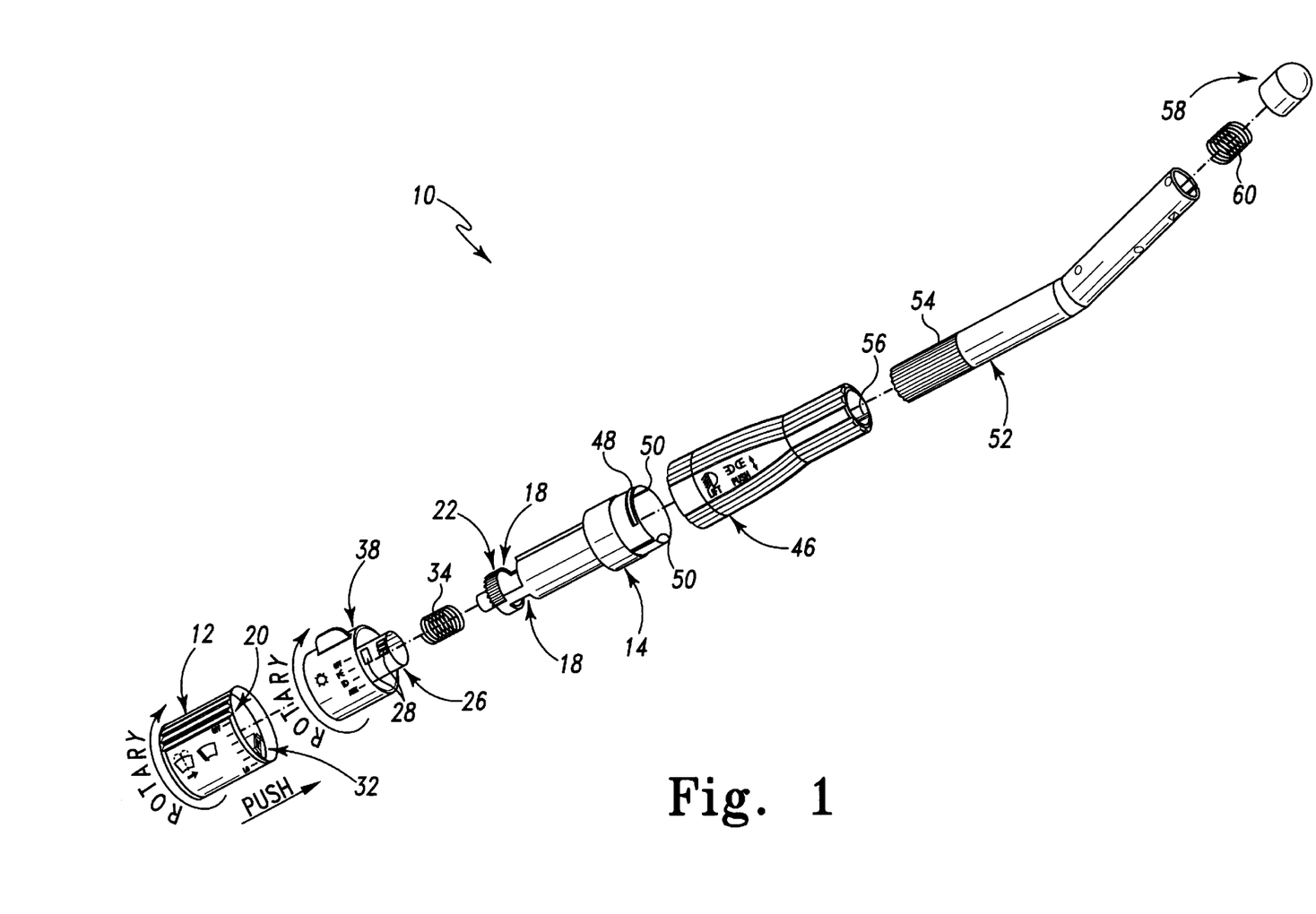
FIG. 1 is a first exploded perspective view of a preferred embodiment multi-function stalk switch of the present invention.
Figure 2:
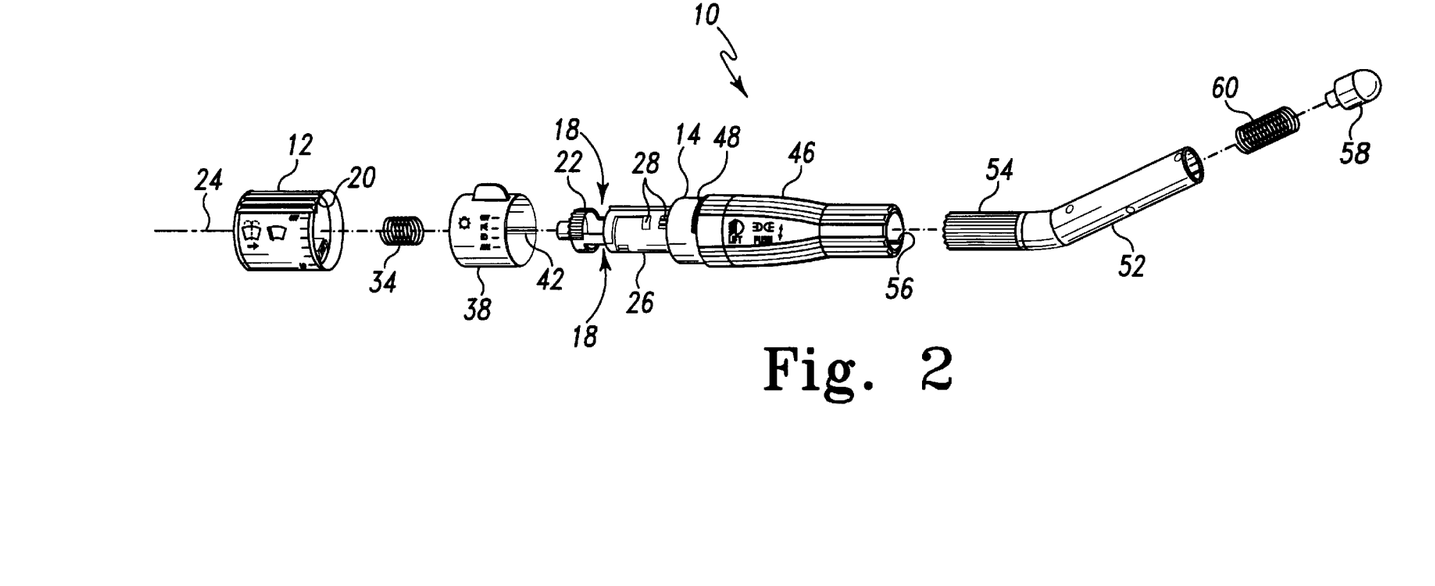
FIG. 2 is a second exploded perspective view of the preferred embodiment of the present invention.
Figures 3A, 3B:
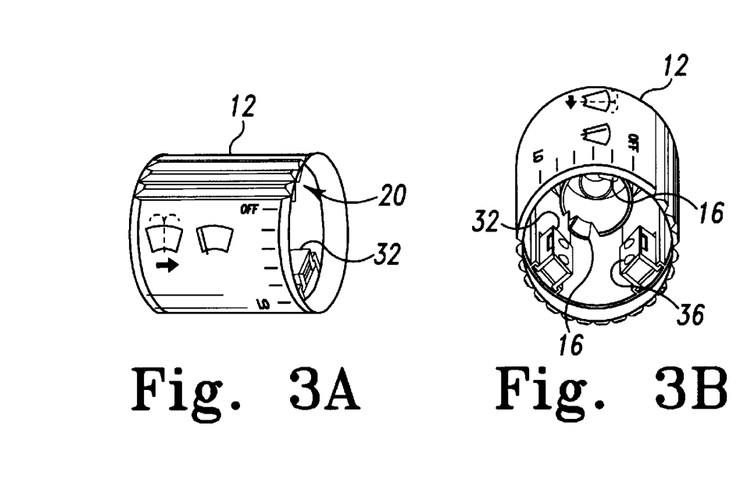
FIGS. 3A–B are perspective views of a first rotary switch module of the preferred embodiment of the present invention.
Figure 10:
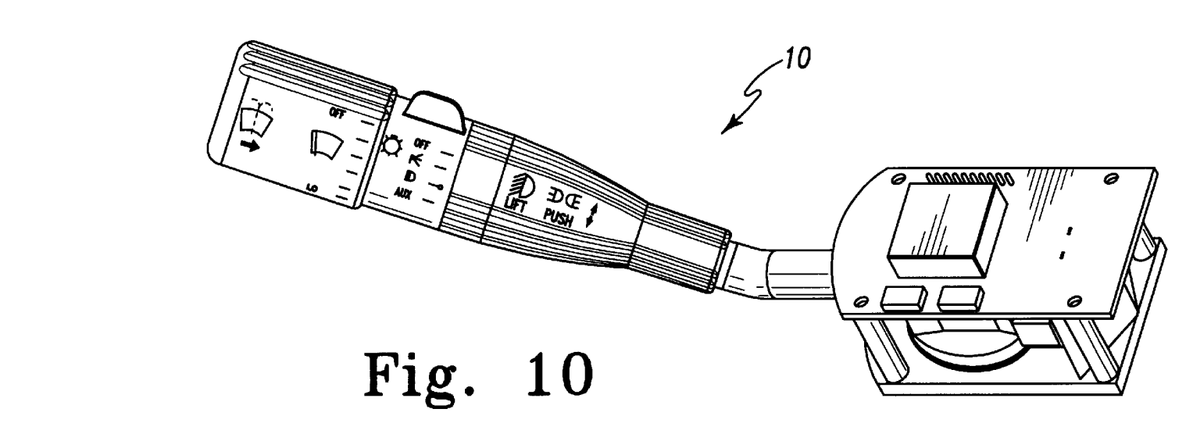
FIGS. 10 and 11 are perspective views of the preferred embodiment of the present invention.
Figure 11:
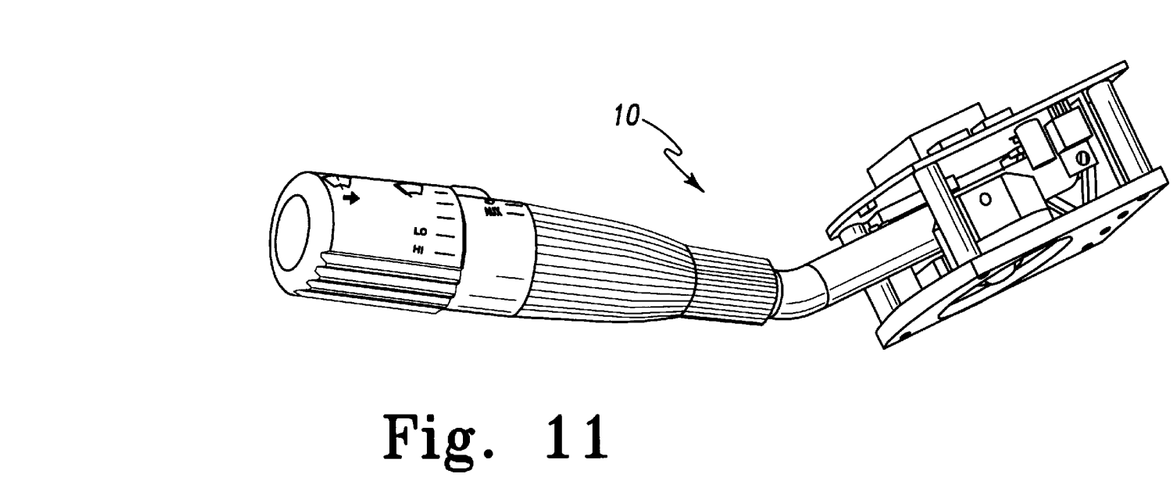

A preferred embodiment of the present invention is illustrated in an exploded perspective view in both FIGS. 1 and 2, and indicated generally at 10. The views of FIGS. 1 and 2 are slightly different in order to more effectively illustrate the interrelationship between the various components in the exploded views. The stalk switch 10 includes a first rotary switch module 12, which is illustrated individually in FIGS. 3A–B. As described hereinbelow, the first rotary switch module 12 also incorporates a non-latching pushbutton function. In the preferred embodiment of the present invention, the first rotary switch module 12 is used to control the functioning of the motor vehicle windshield wipers and windshield washer. The first rotary switch module 12 ordinarily forms the proximal end of the stalk switch 10, the distal end of which is coupled to a rotational receptacle for mounting to the vehicle steering column (see FIGS. 8, 10, and 11).

The first rotary switch module 12 preferably mounts to a rotary switch support member 14 by means of a pair of flexible legs 16 (see FIG. 3B) that snap into a pair of mating receptacles 18 formed into the rotary switch support member 14. Because the arcuate width of each of the flexible legs 16 is less than the arcuate width of each of the mating receptacles 18, the mating between the legs 16 and receptacles 18 permits rotary motion of the first rotary switch module 12 with respect to the rotary switch support member 14 along a fixed arcuate length. Interaction between the legs 16 and the mating receptacles 18 provide end stops for this rotary motion.

Motion between the first rotary switch module 12 and the rotary switch support member 14 is further limited by a male detent 20 located on the inside surface 21 of the first rotary switch module 12, which mates with a series of female detents 22 located on the rotary switch support member 14. Both the male detent 20 and the female detents 22 lie parallel to the longitudinal axis 24 of the stalk switch 10. Both the first rotary switch module 12 and the rotary switch support member 14, including male detent 20 and female detents 22, are preferably made from a substantially incompressible plastic material. The interaction between the male detent 20 and the female detents 22 is therefore plastic-on-plastic, and the detent dimensions are chosen such that the male detent 20 may be forced to override the partitions between the female detents 22 if a sufficient torquing force is applied to the first rotary switch module 12, even though none of the detents compress during this motion. A rotary torque applied to the first rotary switch module 12 will therefore cause the male detent 20 to sequentially snap into adjacent female detents 22 until the torquing force is removed or until the legs 16 interact with the edges of the mating receptacles 18. The plastic-on-plastic detent mating thereby provides a limited range of motion to the first rotary switch module 12, as well as acting to secure the relative orientation of the first rotary switch module 12 with respect to the rotary switch support member 14 when the torquing force is removed from the first rotary switch module 12. The annular snap-fit plastic-to-plastic ratcheting detent system of the present invention represents a significant improvement over the traditional prior art spring-and-ball detent in the areas of cost, parts count, assembly time, and reliability.

Figure 13:
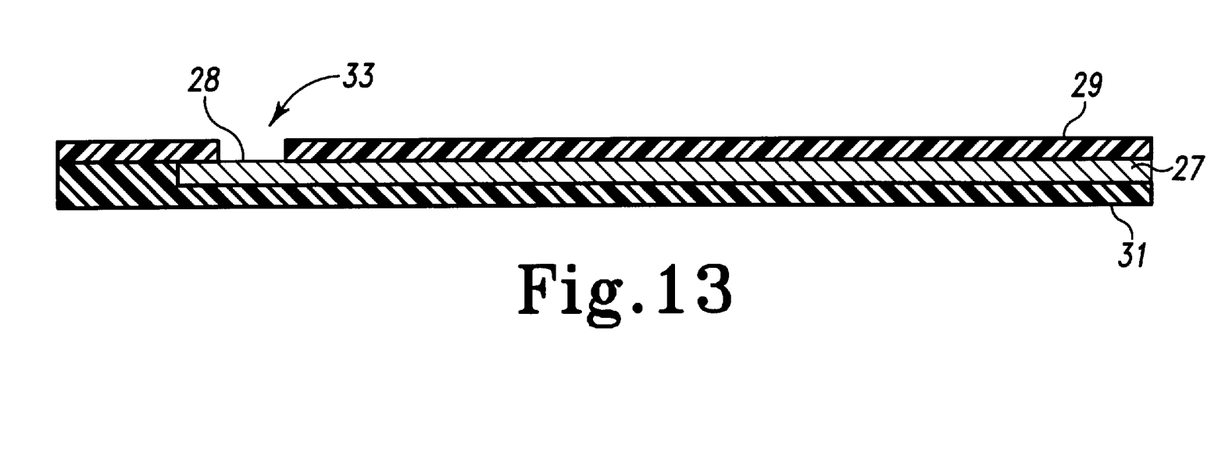
FIG. 13 is a cross-sectional view of the flexible circuit board of FIG. 9.

In order for the first rotary switch module 12 to control activation of the motor vehicle windshield wipers with rotation of the switch module 12 with respect to the rotary switch support member 14, it is necessary that this rotary motion be made to cause, directly or indirectly, some closing of the electrical circuit as a result of its rotary movement. To this end, in the preferred version a flexible printed circuit board 26, having spaced-apart contacts 28 printed thereon, is wrapped around the main central portion of the rotary switch support member 14. The flexible printed circuit board 26 is illustrated in its unrolled state in FIG. 9, including the multi-lead connector portions 30 which extend to the distal end of the stalk for connection to the motor vehicle wiring harness. The flexible lead portions 30 are omitted from the drawings of FIGS. 1 and 2 for clarity of illustration of the remaining components found therein. In the preferred embodiment, the flexible printed circuit board 26 comprises copper-nickel conductor traces 27 sandwiched between two layers 29, 31 of 2 mil (0.002") polyimide film, wherein the conductor traces are gold plated in regions where they are exposed at openings 33, such as at the contacts 28 (see FIG. 13). A first metallic bridge contact 32 located inside the first rotary switch module 12 is used to bridge various contacts 28 printed on the flexible circuit board 26 in order to control functioning of the motor vehicle windshield wipers, depending upon the position of the first rotary switch module 12 with respect to the rotary switch support member 14.

The first rotary switch module 12 preferably also controls functioning of the motor vehicle windshield washer, by changing the position of the first rotary switch module 12 on the longitudinal axis 24 with respect to the rotary switch support member 14. A spring 34 mounts between the first rotary switch module 12 and the rotary switch support member 14, in order to fix a resting separation between the two components; however, pushing on the proximal end of the first rotary switch module 12 is operative to compress the spring 34, thereby moving the first rotary switch module 12 closer to the rotary switch support member 14. This longitudinal movement causes a second metallic bridge contact 36 on the interior of the first rotary switch module 12 to bridge another pair of contacts 28 on the flexible circuit board 26, thereby causing activation of the motor vehicle windshield washer. Removal of the longitudinal force on the proximal end of the first rotary switch module 12 allows the spring 34 to return the first rotary switch module 12 to its original resting position, thereby moving the bridge contact 36 out of contact with the appropriate contacts 28 on the flexible circuit board 26 and turning off the motor vehicle windshield washer. Longitudinal movement of the first rotary switch module 12 therefore can function as a non-latching pushbutton switch.

Figure 4A:
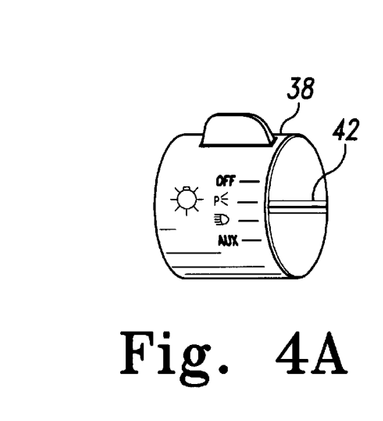
FIGS. 4A–B are perspective views of a second rotary switch module of the preferred embodiment of the present invention.
Figure 4B:
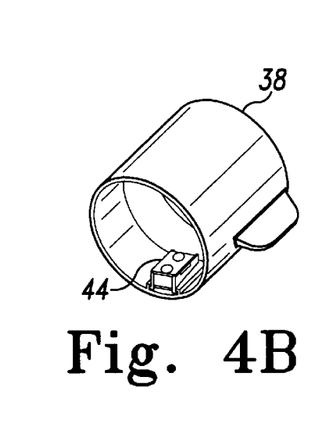
Figure 12:
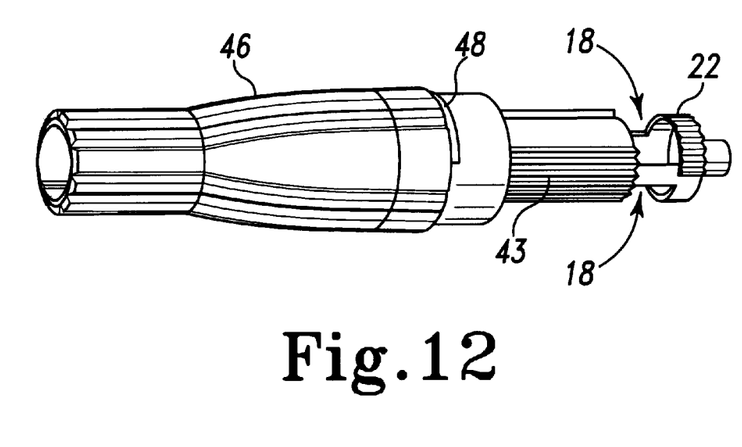
FIG. 12 is a perspective view of a back side of a stationary handle of the preferred embodiment of the present invention.

The multi-function stalk switch 10 of the present invention preferably further includes a second rotary switch module 38, which is separately illustrated in FIGS. 4A–B. The second rotary switch module 38 is used in the preferred embodiment of the present invention to control the motor vehicle headlamps, parking lamps, and/or auxiliary lamps. The second rotary switch module 38 preferably also mounts to the rotary switch support member 14, distal to the mounting location of the first rotary switch module 12. In order to effect this mounting, the rotary switch support member 14 includes an annular groove (not shown) formed therein that extends over a partial circumference of the rotary switch support member 14. The second rotary switch module 38 includes a male annular ring located on the interior surface thereof which extends over a partial circumference of the second rotary switch module 38 (not visible). In such case, the male annular ring of the second rotary switch module 38 is shorter in length than the female annular groove contained in the rotary switch support member 14. Interaction between this male annular ring and the female annular groove serves to lock the second rotary switch module 38 to the rotary switch support member 14 in order to prevent relative displacement of the second rotary switch module 38 with respect to the rotary switch support member 14 along the longitudinal axis 24. However, the male annular ring is shorter in length than the female annular groove, thereby allowing the second rotary switch module 38 to be rotated with respect to the rotary switch support member 14 through a fixed arcuate length. The length of the male annular ring on the interior surface of the second rotary switch module 38 therefore serves to provide a rotary stop for rotary motion of the switch module 38 by virtue of its interaction with the female annular groove. Other arrangements are nevertheless possible within the scope of the inventions. The second rotary switch module 38 preferably includes a male detent 42 formed on an interior surface thereof and positioned to interact with a second set of female detents 43 (see FIG. 12) on the rear side of the rotary switch support member 14 in a manner analogous to that described hereinabove with respect to the male detent 20/female detents 22.

A sliding bridge contact 44 is located on the interior surface of the second rotary switch module 38, and is positioned to interact with a portion of the contacts 28 formed on the flexible printed circuit board 26. Rotation of the second rotary switch module 38 about the longitudinal axis 24 therefore causes electrical connection of various contacts on the flexible circuit board 26 by virtue of the wiping motion of the sliding bridge contacts 44 thereacross. The relative positioning between the second rotary switch module 38 and the rotary switch support member 14 is controlled by interaction between the male detent 42 and the female detents (not shown), as well as by interaction between the male annular ring formed on the interior surface of the switch module 38 and the female annular groove formed into the rotary switch support member 14. As can be seen with reference to the above description, the first and second rotary switch modules may be operated independently and even simultaneously in order to control circuits coupled to the appropriate contacts on the flexible circuit board 26. This feature, when employed, places a great deal of control functionality at the proximal end of the stalk switch 10, where the controls may be conveniently manipulated by the operator of the motor vehicle without removing his or her eyes from the road.

Once the first rotary switch module 12 and the second rotary switch module 38 are mounted to the rotary switch support member 14, the distal end of the rotary switch support member 14 remains exposed. This distal end is mounted to a stationary handle 46. In order to accomplish this mounting, the rotary switch support member 14 includes an annular rib 48 formed partially around the circumference thereof and interrupted by two slots 50 running parallel to the longitudinal axis 24. An annular groove (not shown) formed on an interior surface of the stationary handle 46 accepts the annular rib 48 in order to lock the rotary switch support member 14 to the stationary handle 46. A single rib (not shown) on the interior surface of the stationary handle 46 and running parallel to the longitudinal axis 24 locates into one of the slots 50 of the support member 14 in order to assure proper orientation with the stationary handle 46 and to serve as a locking device (key) to prevent the rotary switch support member 14 from rotating with respect to the stationary handle 46. The second slot 50 in the rotary switch support member 14 diametrically opposite the key slot 50 permits flexing of the support member 14 during assembly.

Once the first and second rotary switch modules are mounted to the rotary switch support member, and once the rotary switch support member is mounted to the stationary handle, this assembly gives the appearance of a unitary structure having multiple switching capabilities. In order to extend this assembly out from the motor vehicle steering column to a position where it is readily accessible by the operator of the motor vehicle, the stationary handle 46 is coupled to an elongated handle stalk 52, which is preferably formed from a hollow metal tube for strength. A circumferential series of serrations 54 facilitate forming a press-fit connection between the stationary handle 46 and the handle stalk 52. In order to key the orientation of the stationary handle 46 to the handle stalk 52, the interior surface of the stationary handle 46 includes a rib 56 extending parallel to the longitudinal axis 24, while the handle stalk 52 includes a single groove (not shown) sized for mating with the rib 56. This ensures that the stationary handle 46 may only be mounted to the handle stalk 52 in one orientation.

Figure 5:
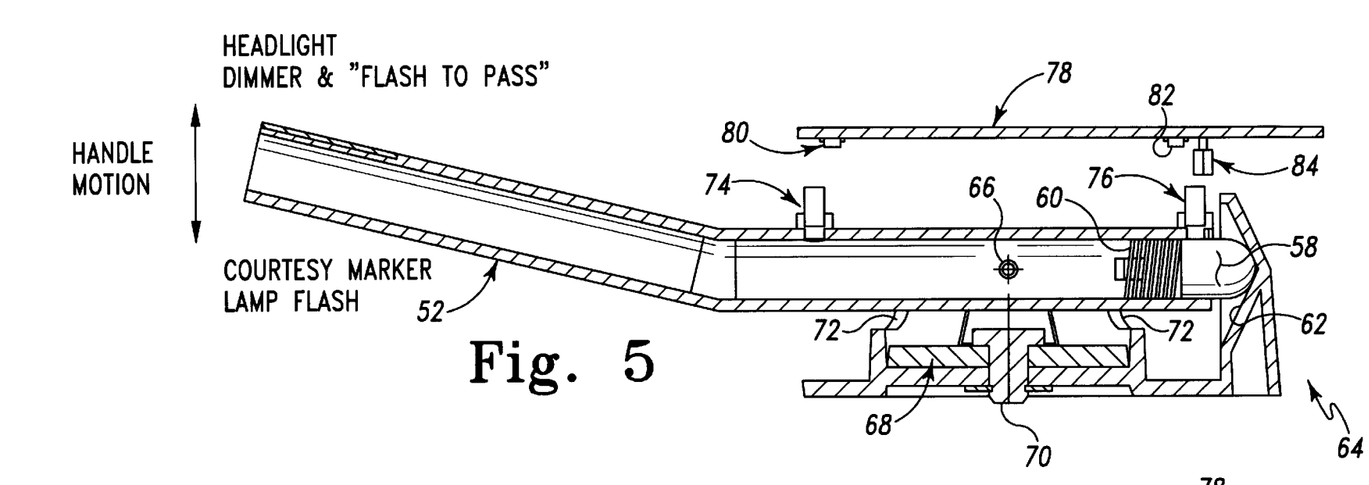
FIG. 5 is a partial cross-sectional view of the preferred embodiment of the present invention in a neutral position.
Figure 6:
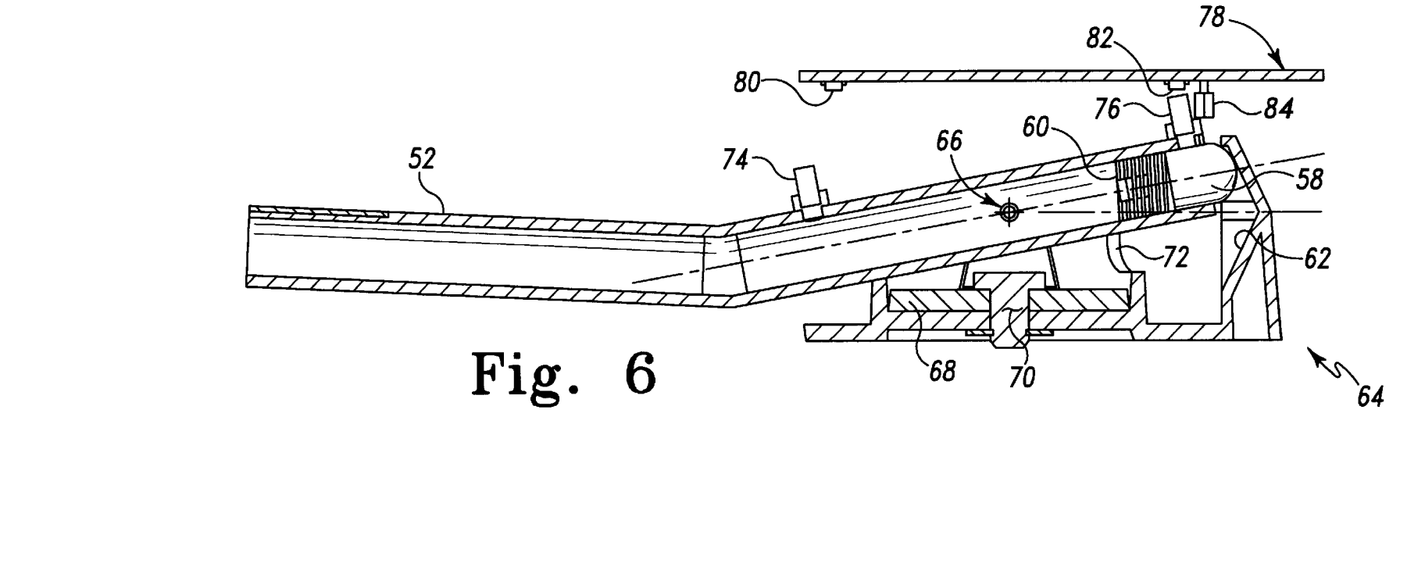
FIG. 6 is a partial cross-sectional view of the preferred embodiment of the present invention positioned to activate the courtesy marker lamp flash function.
Figures 8, 9:
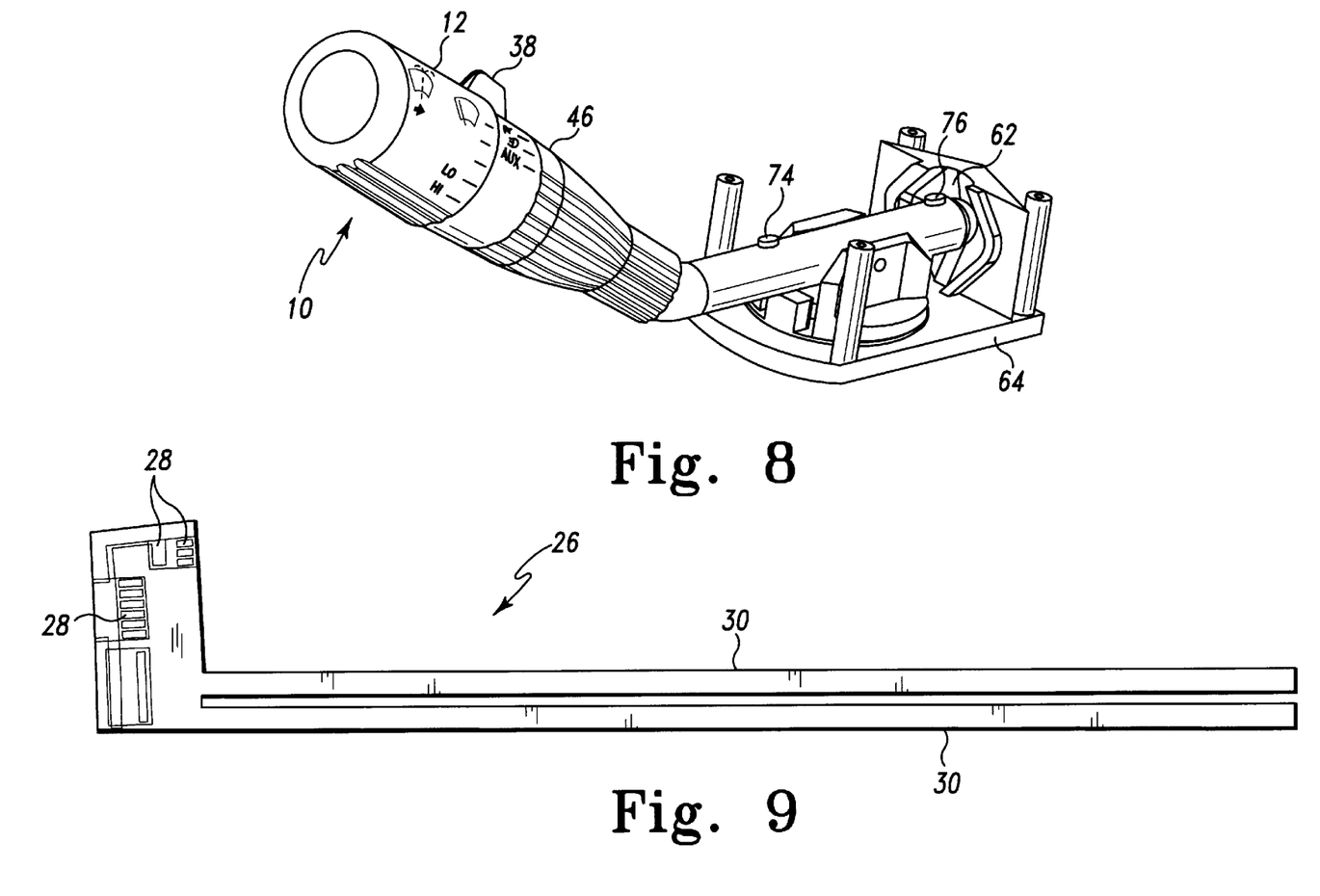
FIG. 8 is a perspective view of the preferred embodiment of the present invention without the circuit board of FIGS. 7A–C mounted thereon.
FIG. 9 is a plan view of a flexible circuit board of the preferred embodiment of the present invention.

A detent is formed at the distal end of the handle stalk 52 by means of a plunger 58 and biasing spring 60. As best seen in FIGS. 5, 6, and 8, the spring-loaded plunger 58 rests in a concave centering mechanism 62 that is formed as part of a rotational receptacle 64. The rotational receptacle 64 allows the multi-function stalk switch 10 to be mounted to a steering column of the motor vehicle while still allowing the stalk switch 10 to be moved in two orthogonal planes. Such movement is accomplished by mounting the stalk switch 10 to the rotational receptacle 64 by means of a pivot pin 66 that extends through the handle stalk 52. The pivot pin 66 in turn mounts to a rotation assembly 68 which is rotatably coupled to the rotational receptacle 64 by means of a second pivot pin 70. The first pivot pin 66 allows the multi-function stalk switch 10 to be pivoted in a first plane, while the second pivot pin 70 allows the stalk switch 10 to be pivoted in a second plane which preferably (but not necessarily) is orthogonal to the first plane. Pivoting in either plane causes the spring-loaded plunger 58 to be compressed as it is moved away from the central position of the concave centering mechanism 62. The force exerted by the compressed biasing spring 60 will automatically return the stalk switch 10 to its central (neutral) position by forcing the plunger 58 to the central portion of the concave centering mechanism 62 once external forces on the stalk switch 10 have been removed. In this manner, the stalk switch 10 is self-centering. Additionally, the walls 72 of the rotational receptacle 64 serve as physical stops for pivoting motion of the stalk switch 10 in either direction in both planes.

A pair of magnets 74 and 76 are mounted to the handle stalk 52 on either side of the first pivot pin 66. The relative position of these magnets 74, 76 are sensed by an array of Hall effect sensor ICs positioned on a circuit board 78 mounted to the rotational receptacle 64. The stalk switch 10 is shown with the circuit board 78 removed in FIG. 8, and is illustrated with the circuit board 78 attached thereto in FIGS. 10 and 11.

Figure 7A:
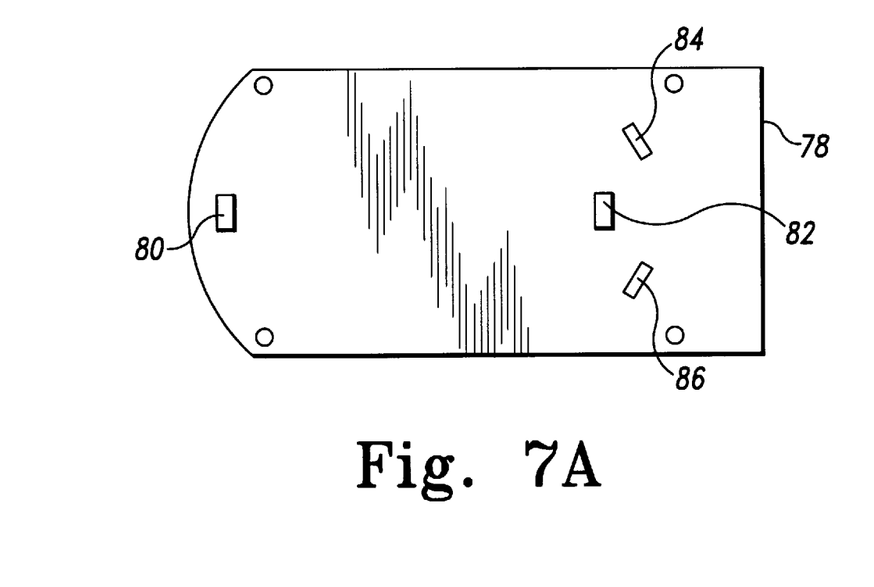
FIGS. 7A–C are a plan view, side elevational view, and an end elevational view, respectively, of a Hall effect sensor mounting circuit board of the preferred embodiment of the present invention.
Figure 7B:
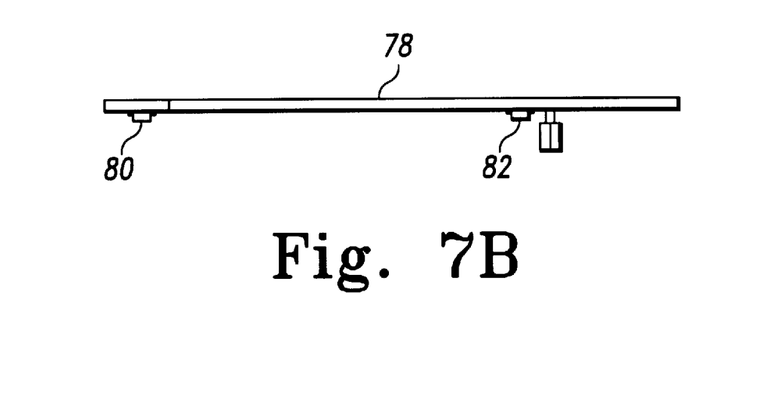
Figure 7C:
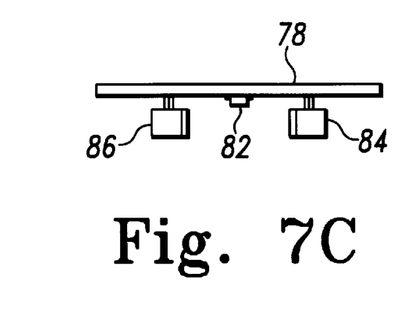

The circuit board 78 is illustrated in three views in FIGS. 7A–C. The circuit board 78 includes two pairs of Hall effect ICs 80–86. Each of the Hall effect ICs is capable of sensing the magnetic field emitted by a magnet, such as the magnets 74, 76, when that magnetic field is brought into close proximity to the Hall effect IC.

When the plunger 58 is centered within the concave centering mechanism 62, the magnets 74, 76 are too far away from the Hall effect ICs 80–86 for any of these Hall effect ICs 80–86 to sense the magnetic field emitted by either magnet. As the stalk switch 10 is moved in either of its planes of motion, one of the magnets 74, 76 will be brought into close proximity with one of the Hall effect ICs 80–86, thereby allowing a controller coupled to the stalk switch 10 to determine what position the stalk switch 10 has been placed in with respect to the rotational receptacle 64. For example, FIG. 5 illustrates the stalk switch 10 in a neutral position, in which the magnets 74, 76 are too far away from any of the Hall effect ICs 80–86 to be sensed thereby. In the preferred embodiment of the present invention, pivoting of the stalk switch 10 about the first pivot pin 66 may be used to activate the headlight dimming and "flash-to-pass" function or the courtesy marker lamp flash function, depending upon the direction of rotation of the stalk switch 10 about the first pivot pin 66. As illustrated in FIG. 6, when the stalk switch 10 is moved in a first direction about the pivot pin 66, the magnet 76 is brought into close proximity with the Hall effect sensor IC 82. At this proximity, the Hall effect sensor IC 82 is able to sense the magnetic field of the magnet 76, and will therefore produce an output which is indicative of this position of the stalk switch 10. Similarly, rotation of the stalk switch 10 in the opposite direction about the first pivot pin 66 will bring the magnet 74 into close proximity with the Hall effect IC 80, thereby indicating rotation of the stalk switch 10 in the opposite direction.

In an analogous fashion, rotation of the stalk switch 10 in the second plane about the second pivot pin 70 will cause the magnet 76 to be brought into close proximity with either the Hall effect sensor IC 84 or the Hall effect sensor IC 86, depending upon the direction of rotation of the stalk switch 10. It will thus be appreciated that movement of the stalk switch 10 in either of the orthogonal planes may be sensed by interaction between the appropriate magnet 74, 76 and the appropriate Hall effect sensor IC 80–86.

From the above description, it will be appreciated that the multi-function stalk switch 10 of the present invention incorporates a pushbutton switch, a first rotary switch, and a second rotary switch onto a single stalk handle, wherein the stalk itself may be rotated in two orthogonal planes in order to accomplish four other switching functions. All of this can be accomplished with a low parts count, a simplified assembly procedure, low cost, and high reliability.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A multi-function stalk switch, comprising:
    a first rotary switch module having a first surface;
    at least one substantially incompressible first detent formed on said first surface;
    a rotary switch support member having a second surface; and
    at least one substantially incompressible second detent formed on said second surface;
    wherein said at least one first detent engages said at least one second detent; and
    wherein dimensions of said at least one first detent and said at least one second detent are such that said at least one first detent is forced to override said at least one second detent when a first sufficient torquing force is applied to said first rotary switch module.

2. The multi-function switch of claim 1,
    wherein said at least one first detent comprises a single male detent; and
    wherein said at least one second detent comprises a plurality of female detents.

3. The multi-function switch of claim 2, further comprising:
    a second rotary switch module having a third surface;
    at least one substantially incompressible third detent formed on said third surface; and
    at least one substantially incompressible fourth detent formed on said second surface, wherein said at least one fourth detent does not overlap said at least one second detent;
    wherein said at least one third detent engages said at least one fourth detent; and
    wherein dimensions of said at least one third detent and said at least one fourth detent are such that said at least one third detent is forced to override said at least one fourth detent when a second sufficient torquing force is applied to said second rotary switch module.

4. The multi-function switch of claim 3, wherein said at least one third detent comprises a single male detent; and
    wherein said at least one fourth detent comprises a plurality of female detents.

5. The multi-function switch of claim 4, further comprising:
    a first conductive bridge contact coupled to said first surface; and
    a flexible circuit board in contact with and substantially conforming to at least a portion of said second surface, said flexible circuit board having a plurality of exposed conductive contacts;
    wherein said first conductive bridge contact is operable to conductively couple at least two of said contacts when said first rotary switch module is at a first position with respect to said rotary switch support member.

6. The multi-function switch of claim 5, wherein said flexible circuit board comprises:

a first layer of flexible, non-conductive material;

a second layer of flexible, non-conductive material;

at least one conductive trace coupled to said contacts, said at least one conductive trace lying between said first and second layer;

at least one opening formed in said first layer such that said plurality of contacts are exposed.

7. The multi-function switch of claim 6, further comprising:

a second conductive bridge contact coupled to said third surface;

wherein said second conductive bridge contact is operable to conductively couple at least two of said contacts when said second rotary switch module is at a second position with respect to said rotary switch support member.

8. The multi-function switch of claim 7, further comprising;

a handle stalk having a proximal end and a distal end, said proximal end being operatively coupled to said rotary switch support member;

a plunger coupled to said stalk distal end such that said plunger may move linearly with respect to said stalk distal end, said plunger being biased in said distal direction;

a rotational receptacle coupled to said handle stalk such that said handle stalk may pivot in at least one plane; and a concave centering mechanism having a concave surface and coupled to said rotational receptacle such that said plunger is in contact with said concave surface;

wherein a pivoting force applied to the handle stalk causes said plunger to be displaced along said concave surface, thereby compressing said plunger away from said distal end; and wherein removal of said pivoting force allows distal linear movement of said plunger in response to said plunger bias, thereby forcing said plunger to a center of said concave surface.

9. The multi-function switch of claim 8, further comprising:

a spring coupled between said handle stalk and said plunger, wherein said spring supplies said biasing force.

10. The multi-function switch of claim 9, further comprising:

a rotation assembly coupled to said handle stalk by means of a first pivot pin therethrough; and a second pivot pin coupling said rotation assembly to said rotational receptacle;

wherein said first pivot pin allows said handle stalk to rotate in a first plane with respect to said rotational receptacle: and wherein said second pivot pin allows said handle stalk to rotate in a second, orthogonal plane with respect to said rotational receptacle.

11. The multi-function switch of claim 10, further comprising:

at least one magnet coupled to said handle stalk; and at least one magnetic field sensor;

wherein at least one magnetic field sensor is positioned to sense movement of said at least one magnet when said handle stalk is rotated in at least one of said first and second planes.

12. The multi-function switch of claim 11, wherein said at least one magnetic field sensor comprises at least one Hall effect sensor.

13. The multi-function switch of claim 12, wherein said at least one magnet comprises a first magnet coupled to said handle stalk proximal of said first pivot pin and a second magnet coupled to said handle stalk distal to said first pivot pin; and wherein said at least one Hall effect sensor comprises a first and second Hall effect sensor for sensing rotation of said handle stalk about said first pivot pin, and a third and a fourth Hall effect sensor for sensing rotation of said handle stalk about said second pivot pin.

14. A multi-function switch, comprising:

a first rotary switch module having a first surface;

a first conductive bridge contact coupled to said first surface;

a rotary switch support member having a second surface; and a flexible circuit board in contact with and substantially conforming to at least a portion of said second surface, said flexible circuit board having a plurality of exposed conductive contacts;

wherein said first conductive bridge contact is operable to conductively couple at least two of said contacts when said first rotary switch module is at a first position with respect to said rotary switch support member.

15. The multi-function switch of claim 14, wherein said flexible circuit board comprises:

a first layer of flexible, non-conductive material;

a second layer of flexible, non-conductive material;

at least one conductive trace coupled to said contacts, said at least one conductive trace lying between said first and second layer;

at least one opening formed in said first layer such that said plurality of contacts are exposed.

16. The multi-function switch of claim 14, further comprising:

a second rotary switch module having a third surface; and a second conductive bridge contact coupled to said third surface;

wherein said second conductive bridge contact is operable to conductively couple at least two of said contacts when said second rotary switch module is at a second position with respect to said rotary switch support member.

17. A stalk switch, comprising:

a handle stalk having a proximal end and a distal end;

a plunger coupled to said stalk distal end such that said plunger may move linearly with respect to said stalk distal end, said plunger being biased in said distal direction;

a rotational receptacle coupled to said handle stalk such that said handle stalk may pivot in at least one plane; and a concave centering mechanism having a concave surface and coupled to said rotational receptacle such that said plunger is in contact with said concave surface;

wherein a pivoting force applied to the handle stalk causes said plunger to be displaced along said concave surface, thereby compressing said plunger away from said distal end; and wherein removal of said pivoting force allows distal linear movement of said plunger in response to said plunger bias, thereby forcing said plunger to a center of said concave surface, regardless of how far said plunger was displaced along said concave surface.

18. The switch stalk of claim 17, further comprising:

a spring coupled between said handle stalk and said plunger, wherein said spring supplies said biasing force.

19. The switch stalk of claim 17, further comprising:

a rotation assembly coupled to said handle stalk by means of a first pivot pin therethrough; and a second pivot pin coupling said rotation assembly to said rotational receptacle;

wherein said first pivot pin allows said handle stalk to rotate in a first plane with respect to said rotational receptacle; and wherein said second pivot pin allows said handle stalk to rotate in a second, orthogonal plane with respect to said rotational receptacle.

20. A multi-function switch, comprising:

a handle stalk having a proximal end and a distal end;

a rotation assembly coupled to said handle stalk such that said handle stalk is rotated with respect to said rotation assembly in at least one plane;

at least one magnet coupled to said handle stalk; and at least one magnetic field sensor;

wherein said at least one magnetic field sensor is positioned to sense movement of said at least one magnet when said handle stalk is rotated.

21. The multi-function switch of claim 20, further comprising:

a first pivot pin coupling said handle stalk to said rotation assembly; and a rotational receptacle coupled to said rotation assembly by a second pivot pin;

wherein said first pivot pin allows said handle stalk to rotate in a first plane with respect to said rotational receptacle; and wherein said second pivot pin allows said handle stalk to rotate in a second, orthogonal plane with respect to said rotational receptacle.

22. The multi-function switch of claim 20, wherein said at least one magnetic field sensor comprises at least one Hall effect sensor.

23. The multi-function switch of claim 21, wherein said at least one magnet comprises a first magnet coupled to said handle stalk proximal of said first pivot pin and a second magnet coupled to said handle stalk distal to said first pivot pin; and wherein said at least one magnetic field sensor comprises a first and a second magnetic field sensor for sensing rotation of said handle stalk about said first pivot pin, and a third and a fourth magnetic field sensor for sensing rotation of said handle stalk about said second pivot pin.

24. The multi-function switch of claim 23, wherein said first, second, third and fourth magnetic field sensors comprise Hall effect sensors.

* * * * *

UNITED STATES PATENT AND TRADEMARK OFFICE
CERTIFICATE OF CORRECTION

PATENT NO. : 6,020,563
DATED : February 1, 2000
INVENTOR(S) : James R. Risk, Jr. et al.

It is certified that error appears in the above-identified patent and that said Letters Patent is hereby corrected as shown below:

On the title page, block [73]- , please delete "Grok" and insert therfore --Grote--.

In block [56] of the title page, column 2, under "Attorney, Agent or Firm", please delete "Woodward" and insert therefore --Woodard--.

In column 2, lines 9 and 26, after "end;", please insert --said proximal end being operatively coupled to said rotary switch support member;--.

In column 5, line 48, "The" should begin a new paragraph.

Signed and Sealed this

Twenty-ninth Day of May, 2001

*Attest:*

NICHOLAS P. GODICI

*Attesting Officer*   Acting Director of the United States Patent and Trademark Office